May 11, 1965

F. PAPKE 3,182,576

REFLEX CAMERA VIEWFINDER INCLUDING COMPOSITE
SETTING DISK WITH FRESNEL LENS SURFACES
AND FOCUSING WEDGES

Filed July 6, 1961

INVENTOR

FRIEDRICH PAPKE

By Blum, Moscovitz, Friedman and Blum

Attorneys

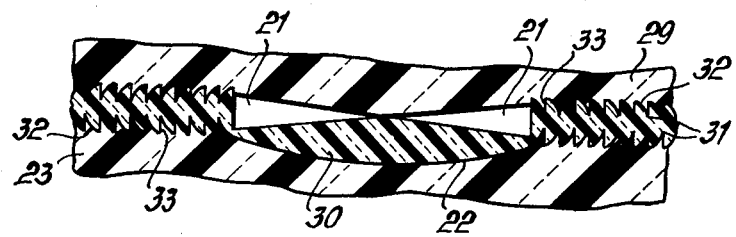
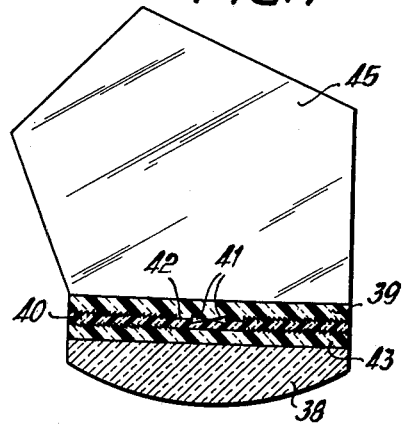
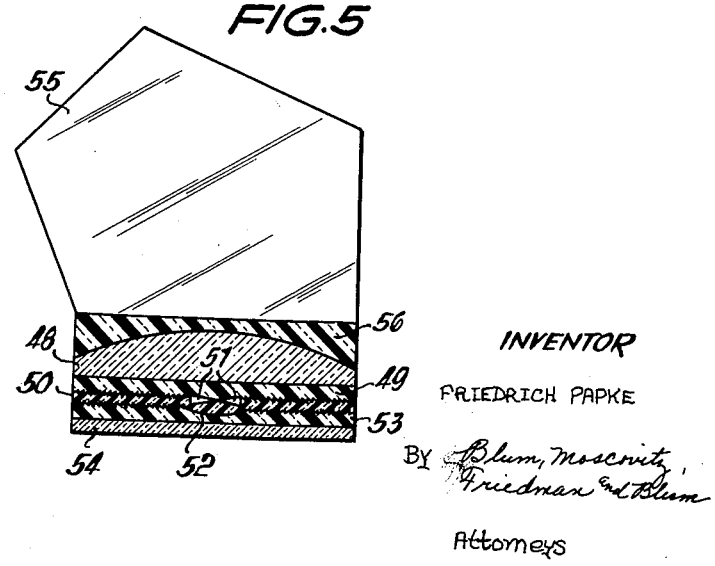

United States Patent Office 3,182,576
Patented May 11, 1965

3,182,576
REFLEX CAMERA VIEWFINDER INCLUDING COMPOSITE SETTING DISK WITH FRESNEL LENS SURFACES AND FOCUSING WEDGES
Friedrich Papke, Braunschweig, Germany, assignor to Voigtländer A.G., Braunschweig, Germany, a corporation of Germany
Filed July 6, 1961, Ser. No. 123,383
Claims priority, application Germany, July 7, 1960, V 18,956
9 Claims. (Cl. 95—42)

This invention relates to viewfinders for photographic cameras and, more particularly, to improved measuring and sighting devices used in focusing cameras of the type having a viewfinder including a true image plane, such as, for example, a single lens reflex camera.

Photographic cameras of the type having finders with a true image plane, such as a single lens reflex type of camera, are frequently provided with devices for use in properly focusing the objective lens, these devices being called by the general term "setting disks." These setting disks may include prisms, lenses, cylindrical lenses, or other optical elements as the indicating components. The indicating components usually function on the principle of the well known split field or coincidence type range finder. The setting devices of this type are generally used in conjunction with ground glass screens or field lenses, Fresnel lenses, and similar condensing elements.

The manufacture of setting disks of this type using glass presents considerable difficulty and, for this reason, they are frequently manufactured of transparent plastic material. It has also been proposed to provide the setting disks in the form of layers of plastic material cast onto glass supporting surfaces, the layers being provided with surface shapes or contours appropriate to the particular end use of the devices. In contrast to air, free surfaces of solid objects have the disadvantage that they readily accumulate dust and other impurities, coupled with the fact that, due to static electricity, the impurity particles adhere very firmly to the plastic material. This is particularly disadvantageous since the faces of setting disks exposed to air, and thus to the accumulation and adherence of dust and the like, lie in the focal plane, or in direct proximity to the focal plane, of the camera. Consequently, the accumulated impurities are readily visible in the field of vision under strong magnification and under good lighting conditions and thus have an annoying and deleterious effect on the sighting and focusing of the camera.

In accordance with the present invention, setting disk constructions are provided in which the foregoing problems are avoided by eliminating, within the range or zone of the measuring or sighting position thereof, all glass-air or plastic-air interfaces. More particularly, this is effected by completely filling all air spaces, normally present between the surfaces of the setting disks and the surfaces of adjacent optical elements, with transparent plastic material.

As a further feature of the invention, it is preferable to have the plastic materials extending from opposite faces of the setting disk to have different refractive indices.

The particular positioning of the elements, such as the setting disk, may be varied as desired. For example, the setting disk may be seated directly on the finder prism as by being cemented thereto or cast thereon. Further, the indicating components of the setting disk can be positioned so as to face the finder prism, and a plastic filler may be used between this surface of the setting disk and the facing surface of the finder prism. One or more field lenses can be positioned adjacent the surface of the setting disk facing the usual hingedly mounted mirror of the camera. These and other variations will be readily apparent to those skilled in the art after a perusal of the following description of the invention.

For an understanding of the principles of the invention, reference is made to the following description of typical embodiments thereof as illustrated in the accompanying drawings. In the drawings:

FIG. 3 is a view corresponding to FIG. 2 but on an enlarged scale to illustrate more clearly details of the construction of FIG. 2;

FIG. 4 is a part schematic and part sectional view through the finder prism, field lens, and setting disk of the camera of FIG. 1 and illustrating a further embodiment of the invention; and FIG. 5 is a view, similar to FIG. 4, illustrating still another embodiment of the invention.

Figure 1:
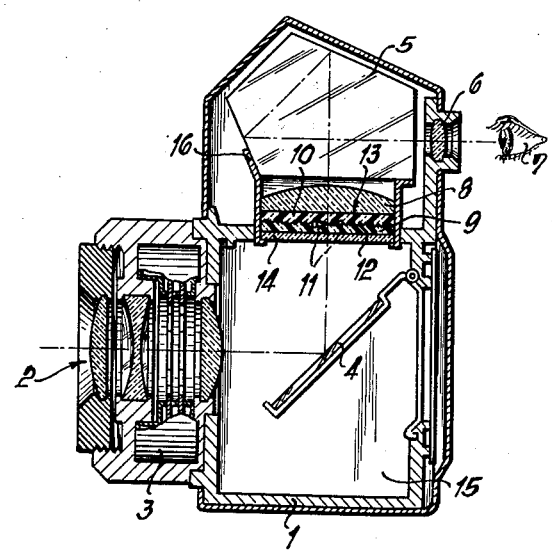
FIG. 1 is a part sectional and part schematic view of a single lens reflex camera in which is incorporated one embodiment of the invention.

Referring first to FIG. 1, one form of the invention is illustrated as incorporated in a single lens reflex camera 1 having an objective lens system 2, a shutter 3, the customary hinged mirror 4, a penta-prism 5 for directing the light rays used in viewfinding, and an ocular 6 through which the eye of the observer sees the view toward which the camera 1 is directed. The particular construction of these several parts of the reflex camera 1 have no bearing on the principles of the invention, and these parts may be varied at will within the scope of the invention.

In the particular arrangement shown in FIG. 1, a plano-convex field lens 8, which may be formed either of glass or of transparent plastic composition material, is included in the optical system, and a setting disk 9, which may be formed either of glass or of transparent plastic composition material, is integrally secured to the plane surface of the field lens 8 by means of an intermediate layer 10 of transparent plastic composition material. The upper surface of the setting disk 9, which carries indicator wedges 11 and Fresnel flutings 12, faces the plane surface 13 of the field lens 8. The plastic layer 10, which may be either cast upon or cemented to the surface 13 of lens 8, provides a junction between this lens and the setting disk which is characterized by the absence of any air gap, air-plastic interface, or air-glass interface. A glass cover plate 14 covers the free face of setting disk 9 on the side facing the mirror 4, so that there is no plastic material surface exposed to the relative large air space 15 within camera 1.

The parts 9 and 10 can be regarded as a single unit and preferably are constructed as an integral unit to conjointly constitute the setting disk, and one of the outstanding features of the present invention is this structural unity of the elements 9 and 10 or the corresponding elements in the other figures of the drawings. In the particular embodiment of FIG. 1, the part 10 of the setting disk is formed of a plastic composition material having a relatively low index of refraction, while the part 9 of the setting disk is formed of a plastic composition material having a definitely higher index of refraction.

The setting disk of the type shown in FIG. 1 can be produced advantageously in the following manner. The layer 10, of transparent plastic composition material, is cast, using a suitable mold onto that surface 13 of the field lens 8 which faces the interior 15 of the camera, and using a counter mold of the part 9. The plastic composition material may be a suitable translucent or transparent casting resin, such as methacrylate resins or resins having properties similar thereto. After the layer 10 has set, the mold is removed and the setting disk 9 is either cast onto the layer 10, or pre-formed as a finished part from a synthetic resin having a high index of refraction and then cemented to the filler 10. Finally, the glass cover plate 14 is cemented to the plane outer or free surface of the plate 9. The three elements 9, 10 and 14 always remain integrated with each other, and form a structural unit which is fitted into the camera proper where it is supported from the penta-prism 5 by suitable retaining means, such as indicated at 16 in FIG. 1. This incorporation of the three elements 9, 10 and 14 into an integrated unit for mounting the camera greatly facilitates the proper alignment of the optical parts of the camera as compared to the known arrangement wherein each part must be individually adjusted and positioned.

Figure 2:
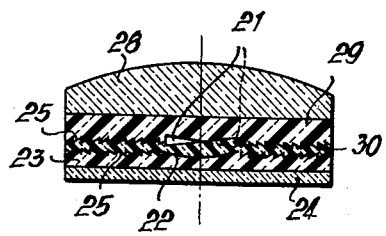
FIG. 2 is a sectional view, substantially on the optical axis of another embodiment of a setting disk assembly incorporating the invention.

FIGS. 2 and 3 illustrate a modified form of setting disk which is cemented to the field lens to form an integral unit characterized by the absence of any air gaps. In this embodiment, as distinguished from the embodiment shown in FIG. 1, an additional layer of plastic composition material is provided. The field lens 28 is a plano-convex lens which is formed of glass or plastic, and the setting disk part 29 is cast onto the plane surface of lens 28, being formed of any suitable transparent casting resin. In a similar manner, a diffusing disk 23 is cast upon or cemented to the plano-parallel glass plate 24, the material of the disk 23 being a suitable transparent plastic composition material. The plastic composition material used for the parts 29 and 23 preferably is one having a relatively low index of refraction.

This provides two integral units, one comprising the lens 28 and the part 29 and the other comprising the diffusing disk 23 and the glass plate 24. These two integrated units are then united with each other by introducing a relatively thin layer 30 of a transparent synthetic resin or plastic composition material, which has a relatively high index of refraction, between the two units. Layer 30 may be formed either by cementing to the two units or by casting therebetween. In the arrangement shown in FIGS. 2 and 3, as thus far described, the optical efficiency of the setting disk is greatly enhanced as compared to the arrangement shown in FIG. 1. At the same time, the arrangement of FIGS. 2 and 3 incorporates various other desirable features, such as the use of identical plastic composition materials for certain of the parts, and the use of the same individual segments, such as rings, lenses and prisms, of the setting disk. In practice, the efficiency of the arrangement shown in FIGS. 2 and 3 is practically double as compared to that of the arrangement shown in FIG. 1.

In the embodiment of the invention shown in FIGS. 2 and 3, a pair of coincidence wedges 21 are provided, and part 23 has a spherically concave surface portion 22 facing the surfaces of the coincidence wedges 21 directed toward the hinged mirror. By providing the spherically concave surface portion 22, the optical effect of the wedges 21 is not affected adversely by the oppositely facing Fresnel rings 25, or by interference due to any separation surfaces of the prism.

As best seen in FIG. 3, the Fresnel lens fluttings of the parts 23 and 29, separated by the intermediate layer 30, are so arranged that their outer edges 31 or apices are aligned with each other. The sloping surfaces 32 of the thus formed Fresnel rings face toward the wedges 21. These sloping surfaces may be either plane or arcuate and, in any event, the sloping surfaces of both sets of Fresnel rings are the same. The other surfaces 33 of the Fresnel rings extend in the same general direction as the optical axis and may be parallel to such optical axis and thus perpendicular to the outer plane surfaces of the parts 29 and 23. Alternatively, these surfaces may have a slight camber. The surfaces 33, as may be noted more particularly in FIG. 3, are aligned with each other on the two parts 23 and 29. Thus, the Fresnel lenses of the two plates are mounted and designed in specular symmetry.

In a particular practical, but non-limiting example, the optical parts shown in FIGS. 2 and 3 may have the following dimensions. The arrangement is designed for mounting in a single lens reflex camera having the miniature format of 24 x 36 mm. The radial distance between the successive flutes forming the Fresnel rings on the two parts 23 and 29 may be from 0.02 to 0.1 mm., and the angle of inclination of the surfaces of the Fresnel serrations with respect to the plane surfaces of the parts 23 and 29 may be from 15 degrees to 60 degrees. Measured between the facing edges of the flutes, the distance between the parts 23 and 29, and which receives the relatively thin layer 30, may be from 0.05 to 0.1 mm. The axial thickness of the plates can be selected as desired in correspondence with the particular conditions to be encountered. The refractive indicies of the material forming the parts 23 and 29 may range from a value of $n=1.45$ to $1.52$, and the refractive index of the material of the intermediate layer 30 may have an index of approximately $n=1.56$ to $1.62$, or may even have a value of $n=1.64$. The foregoing values are applicable also to the embodiments shown in FIGS. 1, 4 and 5.

In the embodiment shown in FIG. 4, a setting disk unit of the type shown in FIGS. 2 and 3 is utilized, but a setting disk unit of the type shown in FIG. 1 could equally well be utilized. In this embodiment, the setting disk unit is integrated directly with the penta-prism 45 of the reflex camera and with the field lens 38 thereof. In place of the field lens 38 shown in FIG. 4, a covering glass plate, such as shown at 14 in FIG. 1, could be used, and one or more field lenses could be mounted in spaced relation to such covering glass plate.

In FIG. 4, the plastic filler layer in engagement with the plane surface of the penta-prism 45 is indicated at 39, with the aforementioned relatively thin intermediate layer being indicated at 40. The coincidence wedges are indicated at 41 and are surrounded by an annular ground glass screen 42 as an example of a variation of the invention. While the spherically concave face, such as shown at 22 in FIGS. 2 and 3, has not been illustrated in FIG. 4, it could be provided if desired. The structural unit is integrally united on one surface with the penta-prism 45 and, on the other surface, with the field lens 38 so that there is no air gap in the unit. The part 39 can be produced by casting onto the prism 45, and the part 43 can be produced by casting onto the field lens 38, with the intermediate layer 40 being cast between the thus formed units.

FIG. 5 shows a self-contained structural unit of the same general type as shown in FIG. 4. In this case, however, the field lens 48 is mounted between the penta-prism 55 and the setting disk assembly. A glass cover plate 54 is provided, forming part of the setting disk structural unit and facing the hinged mirror of the reflex camera. The setting disk structural unit, which is essentially similar to that shown in FIGS. 2 and 3, is cemented between the cover plate 54 and the plane face of the field lens 48. The two parts of the setting disk structural unit which are formed of transparent plastic composition material or synthetic resin having a relatively low index of refraction are indicated at 49 and 53, while the intermediate layer, formed of plastic which is transparent and has a relatively higher index of refraction, is indicated at 50. The indicator wedges are indicated at 51, while the spherically concave surface portion of part 53 is indicated at 52. A plastic filler, which either may be cast in place or comprise a cement, is indicated at 56 as uniting the convex surface of the lens 48 to the plane end surface of the penta-prism 55.

While specific embodiments of the invention have been shown and described in detail to illustrate the application of the principles of the invention, it will be understood that the invention may be embodied otherwise without departing from such principles.

What is claimed is:

1. In a viewfinder of the type including optical elements for directing light rays, entering a camera through a focusable objective, along a pre-set path to the camera ocular, and a setting device interposed in such path and carrying optical wedges for indicating the focusing of the objective, said setting device comprising superposed integrally united first Fresnel lens disk and filler elements of transparent material, said Fresnel lens element supporting said optical wedges and said filler element being superposed with said first Fresnel lens element and enclosing said optical wedges, at least one of said elements comprising plastic composition material, and said elements having respective and different indices of refraction, and a second Fresnel lens element in axially spaced relation to said first Fresnel lens element, constituting a diffusing disk having a surface, facing said first Fresnel lens element, formed with Fresnel flutings in opposed alignment with those of said first Fresnel lens element, the sloping surfaces of the two sets of flutings being co-ordinated with each other and said second Fresnel lens element being situated between said objective and said filler element, said filler element completely contacting and conforming to the configuration of said Fresnel lens elements at said flutings thereof and also conforming to the configuration of and contacting said optical wedges which are supported by said first Fresnel lens element, one of said Fresnel lens elements forming an outer element of said setting device and comprising plastic composition material integrally united with the end face of an optical element adjacent said setting device along the light ray path.

2. The setting device defined in claim 1, in which said outer element is joined to an end face of a field lens constituting one of said optical elements; and a cover plate of transparent material covering the other end face of said setting device; said field lens, said setting device, and said cover plate forming an integral structural unit characterized by the absence of any interior air spaces.

3. The setting device defined in claim 2 in which the camera is a single lens reflex camera and one of said optical elements is a penta-prism; and a retaining element mounting said structural unit on said penta-prism in the path of light rays entering said penta-prism.

4. The setting device defined in claim 3, in which the inner surface of the diffusing disk includes a spherically concave surface portion facing said optical wedges supported by said first Fresnel lens element.

5. The setting device defined in claim 3 in which said field lens is a plano-convex lens having its plane surface united to an end surface of said setting device; a filler of transparent plastic material filling the space between the convex surface of said field lens and the light entry surface of said penta-prism; and a glass plate, constituting said cover plate, cemented to the other end face of said setting device.

6. The setting device defined in claim 1 in which the sloping surfaces of the two sets of flutings slope toward the optical wedges; the opposite surfaces of the two sets of flutings extending at not greater than a very small acute angle to the optical axis of said Fresnel lens elements.

7. The setting device defined in claim 1, in which said first Fresnel lens element comprises a transparent material having a higher index of refraction than that of the material of said filler element.

8. The setting device defined in claim 1, in which the materials of said first Fresnel lens element and said diffusing disk are the same and have a relatively low index of refraction, said filler element being composed of a plastic mateiral having a relatively high index of refraction.

9. The setting device defined in claim 8, in which said adjacent optical element is a field lens cemented to said first Fresnel lens element which constitutes said outer element of said setting device, and a glass cover plate united to the outer face of said diffusing disk.

References Cited by the Examiner
UNITED STATES PATENTS

| 982,772 | 1/11 | Wadsworth | 88—60 |
| 1,044,135 | 11/12 | Buechner | 88—28.93 |
| 2,393,308 | 1/46 | Brown. | |
| 2,887,019 | 5/59 | Dodin. | |
| 3,003,407 | 10/61 | Grey | 88—1.5 X |

FOREIGN PATENTS

| 723,996 | 1/32 | France. |
| 1,107,591 | 8/55 | France. |
| 816,293 | 7/59 | Great Britain. |

DAVID H. RUBIN, *Primary Examiner.*